Patented Oct. 31, 1944

2,361,825

UNITED STATES PATENT OFFICE

2,361,825

REDUCTION OF SULPHUR DIOXIDE TO HYDROGEN SULPHIDE AND FREE SULPHUR

Thomas F. Doumani, Wilmington, Calif., assignor to Union Oil Company of California, Los Angeles, Calif., a corporation of California No Drawing. Application August 25, 1941, Serial No. 408,259

5 Claims. (Cl. 23—226)

This invention relates to a process for reducing sulphur dioxide. It is an object to reduce sulphur dioxide to hydrogen sulphide and free sulphur by means of hydrogen or hydrogen-containing gases. It is a further object to employ dilute as well as concentrated sulphur dioxide containing gases at relatively low temperatures for this reduction. It is an additional object to reduce the sulphur dioxide in the presence or absence of water vapor.

The reduction of sulphur dioxide with hydrogen has been known for many years. Bacon (U. S. Patent No. 1,840,076) claimed the reduction of sulphur dioxide with hydrogen at a temperature not exceeding 500° C. (932° F.) in the presence of elementary sulphur as a catalyst. Boswell (U. S. Patent No. 1,880,741) recommended reducing sulphur dioxide with hydrogen in the presence of oxides of the iron group as catalysts. Boswell later (U. S. Patent No. 2,026,819) covered specifically a process of producing a catalyst for this reduction which consisted in partly dehydrating a compound or compounds of a metal of the iron group, selected from a group of compounds consisting of hydrated sulphides, and a mixture of hydrated sulphides with hydroxides or oxides, in the absence of air, subjecting the partly dehydrated material to the action of oxygen to increase its susceptibility to the action of sulphur dioxide, subjecting it to the action of sulphur dioxide at more than room temperature, and finally subjecting the material to the action of hydrogen and sulphur dioxide at a higher temperature than that of the previous treatment with sulphur dioxide.

I have found that at relatively low temperatures, about 600° F. (316° C.), oxides of the iron group are not catalysts for the reduction of sulphur dioxide with hydrogen. For example, a gas consisting of three per cent sulphur dioxide and five per cent hydrogen was passed through an iron oxide catalyst (prepared by dehydration from ferric hydroxide) for five hours at a space velocity of 550 volumes of gas per unit volume of catalyst per hour. The catalyst consisted of twenty-five per cent ferric oxide on "Celite" and was found not to catalyze this reaction at this temperature. At first when the reaction temperature was raised to 900° F. (482° C.) there was no noticeable reaction, however, very soon thereafter the reaction commenced. Furthermore, the amount of conversion for a given space velocity was found to increase with time. The reaction was interrupted and upon inspection of the catalyst, I found that the top one-third of the iron catalyst at the exit end of the tube had been converted to the sulphide and that iron sulphide was being formed during the reduction, which explains the increase in catalytic activity with time, and the fact that at low temperatures iron oxide is not a catalyst for the reduction of sulphur dioxide with hydrogen. I then found that by passing hydrogen sulphide through metal oxides of the iron group at temperatures from 100° C. (212° F.) to about 500° C. (532° F.) the metal oxides were converted to the sulphides producing very active catalysts. Their superior catalytic activity was pronounced even at temperatures as low as 600° F. (316° C.) whereas, the metal oxides showed no activity at this low temperature. These metal sulphides can be used at much higher temperatures than 600° F., such as 900° F., 1500° F., 2000° F., and 2400° F. Thus, these metal sulphides of the iron group are excellent catalysts for the reduction of sulphur dioxide to hydrogen sulphide and free sulphur. The practical significance of the observation that it is the sulphide of the metal which is the catalyst and not the oxide rests in the fact that regeneration of the sulphide catalyst is not necessary; whereas, if the metal oxides were the catalysts regeneration would be necessary since the catalyst would be transformed to the sulphide as the reduction proceeded.

Other metal sulphides can also be used besides those of iron, nickel, and cobalt, the so-called "iron group," such as molybdenum, manganese and chromium sulphides: Collectively these are the active hydrogenation sulphides of metals of sub-groups 6, 7, 8, 9 and 10 of the periodic table of the elements. The gases employed should be substantially free of oxygen to avoid oxidation of the metal sulphide catalyst to the metal oxide.

These metal sulphides may be placed on various materials as carriers, such as alumina, bauxite, diatomaceous earth, concrete, etc. Bauxite containing 8.8% ferric oxide and 4% titanium dioxide upon treatment with hydrogen sulphide, as described in the example, produced a very effective catalyst for the reduction of sulphur dioxide to hydrogen sulphide and sulphur.

I have found that the reduction products of sulphur dioxide with excess hydrogen always consist of a mixture of hydrogen sulphide, gaseous sulphur, water vapor, and some polythionic acids associated with the condensed water. If insufficient hydrogen is employed to reduce completely all the sulphur dioxide, the latter gas will, of course, also be found with the reduction products. Contrary to the belief of some investigators, I have found it impossible to reduce sulphur dioxide exclusively to free gaseous sulphur without the formation of hydrogen sulphide. This is exactly as is predicted from theory by a consideration of the equilibrium constants for the following equations which are applicable at the temperatures at which the reaction rate is sufficiently great to be of practical importance. These practical temperatures are from 600° F. to 2400° F.

$$2SO_2 + 4H_2 \rightleftarrows S_2 + 4H_2O \quad \text{(Eq. 1)}$$
$$SO_2 + 2H_2 \rightleftarrows \tfrac{1}{8}S_8 + 2H_2O \quad \text{(Eq. 2)}$$
$$2H_2 + S_2 \rightleftarrows 2H_2S \quad \text{(Eq. 3)}$$

Gaseous sulphur consists of both $S_2$ and $S_8$ at the temperatures employed for this reduction, and with increasing temperatures the relative amount of $S_2$ increases.

When the reduction of sulphur dioxide is carried out under pressure the reaction proceeds much more quickly and completely than at atmospheric pressure. Under these superatmospheric pressures the sulphur exists in the gaseous state largely $S_8$ rather than $S_2$, and the reduction proceeds according to the following equation:

$$8SO_2 + 16H_2 \rightleftarrows S_8 + 16H_2O \quad \text{(Eq. 4)}$$

In Equation 4, there is a reduction of seven volumes of gas as the reaction proceeds from left to right, whereas, in Equation 1 with $S_2$ as the product rather than $S_8$, there is only a reduction of one volume of gas. This explains why superatmospheric pressures can be advantageously employed for this reduction. Although pressures in excess of 1000 lbs. per sq. in. can be used, a good range of operating pressures is from atmospheric to 300 lbs. per sq. in.; or more specifically 150 to 300 lbs. per sq. in. At these pressures and at temperatures from 600° F. to 1500° F., sulphur dioxide alone or with water vapor and/or inert gases such as nitrogen, carbon dioxide, or hydrocarbons, complete reduction of the sulphur dioxide to hydrogen sulphide and free sulphur can be effected with hydrogen. The hydrogen can be pure or mixed with inert gases and the ratio of hydrogen to sulphur dioxide should exceed 2, and preferably be about 2.2 if it is desired to convert all the sulphur dioxide to hydrogen sulphide and free sulphur. With a ratio of hydrogen to sulphur dioxide of 3 or greater, all of the sulphur dioxide can be converted to hydrogen sulphide with but traces of free sulphur. By decreasing the hydrogen-sulphur dioxide ratio, the amount of unreacted sulphur dioxide increases, so that any desired ratio of hydrogen sulphide to sulphur dioxide in the product can be obtained. At 600° F., using a ratio of hydrogen to sulphur dioxide of 2.0 in a gaseous mixture feed containing 96 per cent inert gas, the hydrogen sulphide-sulphur dioxide ratio was 2 to 1, in the product as required for the following equation:

$$2H_2S + SO_2 \rightleftarrows 3S + 2H_2O \quad \text{(Eq. 5)}$$

To effect this reaction (Eq. 5) it is necessary to conduct the gases over a dehydrating catalyst such as bauxite, alumina, or calcium sulphate at much lower temperatures than are required for the reduction of sulphur dioxide with hydrogen.

I have found that when the reduction of sulphur dioxide with hydrogen is carried out in the presence of water vapor, the composition of the resulting reduction products are different than when substantially dry gases are employed. This is especially true at temperatures above 900° F. and with gases containing a considerable amount of water vapor, such as greater than 10 per cent. This effect of water vapor on the composition of the reduction products is due to the following reaction of sulphur vapor with water vapor:

$$\tfrac{3}{2}S_2 + 2H_2O \rightleftarrows 2H_2S + SO_2 \quad \text{(Eq. 6)}$$

Thus, the amount of free sulphur which is formed with the hydrogen sulphide decreases with increase in temperature, and the amount of hydrogen sulphide increases with an equivalent amount of sulphur dioxide as required by Eq. 6; however, regardless of whether a dry or wet gas is employed in this reduction, the hydrogen is all consumed at temperatures above 600° F. When an excess of hydrogen is employed for the conversion of the sulphur dioxide to hydrogen sulphide, namely, when greater than 3 moles of hydrogen are used per mole of sulphur dioxide, the water vapor has no substantial effect upon the composition of the reduction products.

*Example*

A very active iron oxide-alumina gel catalyst pretreated with hydrogen sulphide was prepared as follows: 254 grams (0.627 mole) of $$Fe(NO_3)_3 \cdot 9H_2O$$

was dissolved in 5 liters of distilled water and mixed with 1105 grams (2.94 moles) of $$Al(NO_3)_3 \cdot 9H_2O$$

dissolved in 5 liters of dissolved water. To this solution was added about one liter of concentrated ammonium hydroxide (28–9%) until alkaline to litmus paper, and the resulting precipitate filtered through a large Bückner funnel. The precipitate was washed free of ammonium hydroxide and salts by vigorously stirring with about four liters of distilled water followed by filtration; this was repeated four times. Air was passed through the gel on the Bückner funnel until no more water passed into the filtrate. The gel was then cut into small squares (about ⅞ inch) placed in a large evaporating dish and dried at 430° F. for 18 hours. The dried product consisted of small squares (about ¼ inch). The catalyst was crushed in a mortar and pestle to pass a twelve mesh standard Tyler screen, but was held on the twenty mesh screen.

A gas of the approximate composition ($SO_2$—2.6%, $H_2$—5.2%, $H_2O$—13.0%, $N_2$—79.2%)

was passed through the catalyst at 600° F. (316° C.) using a space velocity of about 550 volumes of gas per unit volume of catalyst per hour. Even after four hours of passage of the gas at this same temperature, there was no reaction detectable, as evidenced by the lack of deposition of any sulphur in the exit tube. At 900° F., the catalyst showed little activity for this reduction.

The iron oxide in the above catalyst was converted to the sulphide, by the passage of hydrogen sulphide through the catalyst for five hours at 610° F. This gel originally consisting of 25 per cent ferric oxide and 75 per cent aluminum oxide after treatment with hydrogen sulphide to convert the iron oxide to the sulphide, produced an excellent catalyst for this reduction, enabling the use of temperatures as low as 600° F. with a space velocity of over 600 volumes of gas per unit volume of catalyst per hour. With this catalyst substantially all of the sulphur dioxide contained in dilute or concentrated sulphur dioxide-containing gases, and with or without water vapor can be reduced to hydrogen sulphide and free sulphur.

I claim:

1. A process for the reduction of sulphur dioxide to elementary sulphur and hydrogen sulphide, which comprises contacting sulphur dioxide at a temperature from 600° F. to 2400° F. with hydrogen and a catalyst composed of a sulphide of one of the elements selected from the iron group consisting of iron, nickel and cobalt distended upon aluminum oxide, said catalyst having been formed by preparing an aqueous solution containing a soluble salt of one of the members selected from the group consisting of iron, cobalt and nickel and a soluble salt of alumina, coprecipitating the metals from said aqueous solution by the addition of ammonium hydroxide thereto, washing the precipitate so formed with water, drying the water washed precipitate, and passing hydrogen sulphide through the dried precipitate in sufficient quantity to convert the element of the iron group into a sulphide.

2. A process according to claim 1 in which a soluble iron salt is employed and the proportion of soluble aluminum salt to soluble iron salt is such as to yield a precipitate containing the equivalent of about 75% aluminum oxide and about 25% of ferric oxide.

3. A process for the reductitn of sulphur dioxide to hydrogen sulphide substantially free from elementary sulphur, which comprises contacting a feed gas containing sulphur dioxide at a temperature between about 900° F. and 2400° F., with hydrogen in the proportion of at least 3 mols of hydrogen to 1 mol of sulphur dioxide and a catalyst composed of a sulphide of one of the elements selected from the iron group consisting of iron, nickel and cobalt distended upon aluminum oxide, said catalyst having been formed by preparing an aqueous solution containing a soluble salt of one of the members selected from the group consisting of iron, cobalt and nickel and a soluble salt of alumina, coprecipitating the metals from said aqueous solution by the addition of ammonium hydroxide thereto, washing the precipitate so formed with water, drying the water washed precipitate, and passing hydrogen sulphide through the dried precipitate in sufficient quantity to convert the element of the iron group into a sulphide.

4. A process according to claim 3 wherein the feed gas contains at least about 10% of water vapor.

5. A two-stage process for the reduction of sulphur dioxide to elementary sulphur which comprises contacting a feed gas containing sulphur dioxide and at least about 10% of water vapor, with hydrogen in the proportion of about 2.0 mols of hydrogen per mol of sulphur dioxide, in the presence of a catalyst, at a temperature between about 900° F. and 2400° F., in the first stage; and contacting the resulting gaseous mixture containing hydrogen sulphide and unreacted sulphur dioxide with a dehydration catalyst, at a temperature below 600° F., in the second stage; the catalyst employed in the first stage having been formed by preparing an aqueous solution containing a soluble salt of one of the members selected from the group consisting of iron, cobalt and nickel and a soluble salt of alumina, coprecipitating the metals from said aqueous solution by the addition of ammonium hydroxide thereto, washing the precipitate so formed with water, drying the water washed precipitate, and passing hydrogen sulphide through the dried precipitate in sufficient quantity to convert the element of the iron group into a sulphide.

THOMAS F. DOUMANI.

---

CERTIFICATE OF CORRECTION.

Patent No. 2,361,825.                                              October 31, 1944.

THOMAS F. DOUMANI.

It is hereby certified that error appears in the printed specification of the above numbered patent requiring correction as follows: Page 1, second column, line 10, for "(532° F.)" read --(932° F.)--; page 3, first column, line 31, claim 3, for "reductitn" read --reduction--; and that the said Letters Patent should be read with this correction therein that the same may conform to the record of the case in the Patent Office.

Signed and sealed this 13th day of February, A. D. 1945.

Leslie Frazer (Seal)                                                    Acting Commissioner of Patents.

in dilute or concentrated sulphur dioxide-containing gases, and with or without water vapor can be reduced to hydrogen sulphide and free sulphur.

I claim:

1. A process for the reduction of sulphur dioxide to elementary sulphur and hydrogen sulphide, which comprises contacting sulphur dioxide at a temperature from 600° F. to 2400° F. with hydrogen and a catalyst composed of a sulphide of one of the elements selected from the iron group consisting of iron, nickel and cobalt distended upon aluminum oxide, said catalyst having been formed by preparing an aqueous solution containing a soluble salt of one of the members selected from the group consisting of iron, cobalt and nickel and a soluble salt of alumina, coprecipitating the metals from said aqueous solution by the addition of ammonium hydroxide thereto, washing the precipitate so formed with water, drying the water washed precipitate, and passing hydrogen sulphide through the dried precipitate in sufficient quantity to convert the element of the iron group into a sulphide.

2. A process according to claim 1 in which a soluble iron salt is employed and the proportion of soluble aluminum salt to soluble iron salt is such as to yield a precipitate containing the equivalent of about 75% aluminum oxide and about 25% of ferric oxide.

3. A process for the reductitn of sulphur dioxide to hydrogen sulphide substantially free from elementary sulphur, which comprises contacting a feed gas containing sulphur dioxide at a temperature between about 900° F. and 2400° F., with hydrogen in the proportion of at least 3 mols of hydrogen to 1 mol of sulphur dioxide and a catalyst composed of a sulphide of one of the elements selected from the iron group consisting of iron, nickel and cobalt distended upon aluminum oxide, said catalyst having been formed by preparing an aqueous solution containing a soluble salt of one of the members selected from the group consisting of iron, cobalt and nickel and a soluble salt of alumina, coprecipitating the metals from said aqueous solution by the addition of ammonium hydroxide thereto, washing the precipitate so formed with water, drying the water washed precipitate, and passing hydrogen sulphide through the dried precipitate in sufficient quantity to convert the element of the iron group into a sulphide.

4. A process according to claim 3 wherein the feed gas contains at least about 10% of water vapor.

5. A two-stage process for the reduction of sulphur dioxide to elementary sulphur which comprises contacting a feed gas containing sulphur dioxide and at least about 10% of water vapor, with hydrogen in the proportion of about 2.0 mols of hydrogen per mol of sulphur dioxide, in the presence of a catalyst, at a temperature between about 900° F. and 2400° F., in the first stage; and contacting the resulting gaseous mixture containing hydrogen sulphide and unreacted sulphur dioxide with a dehydration catalyst, at a temperature below 600° F., in the second stage; the catalyst employed in the first stage having been formed by preparing an aqueous solution containing a soluble salt of one of the members selected from the group consisting of iron, cobalt and nickel and a soluble salt of alumina, coprecipitating the metals from said aqueous solution by the addition of ammonium hydroxide thereto, washing the precipitate so formed with water, drying the water washed precipitate, and passing hydrogen sulphide through the dried precipitate in sufficient quantity to convert the element of the iron group into a sulphide.

THOMAS F. DOUMANI.

---

CERTIFICATE OF CORRECTION.

Patent No. 2,361,825.

October 31, 1944.

THOMAS F. DOUMANI.

It is hereby certified that error appears in the printed specification of the above numbered patent requiring correction as follows: Page 1, second column, line 10, for "(532° F.)" read --(932° F.)--; page 3, first column, line 31, claim 3, for "reductitn" read --reduction--; and that the said Letters Patent should be read with this correction therein that the same may conform to the record of the case in the Patent Office.

Signed and sealed this 13th day of February, A. D. 1945.

Leslie Frazer (Seal)　　　　　　　　　　　　　　　Acting Commissioner of Patents.